(12) United States Patent
Lettkeman et al.

(10) Patent No.: US 9,346,996 B1
(45) Date of Patent: May 24, 2016

(54) OIL WELL CEMENTING PRODUCTS WITH SYNTHETIC GYPSUM AND METHODS

(71) Applicant: United States Gypsum Company, Chicago, IL (US)

(72) Inventors: Dennis Mark Lettkeman, Watonga, OK (US); John Wesley Wilson, Fairview, OK (US); Doug Blackburn, Port Clinton, OH (US); Brian K. Ball, Fort Dodge, IA (US); Raymond A. Kaligian, Geneva, IL (US); Mike L. Cloud, Canton, OK (US)

(73) Assignee: UNITED STATES GYPSUM COMPANY, Chicago, IL (US)

( * ) Notice: Subject to any disclaimer, the term of this patent is extended or adjusted under 35 U.S.C. 154(b) by 0 days.

(21) Appl. No.: 14/623,724

(22) Filed: Feb. 17, 2015

(51) Int. Cl.
 *C04B 11/00* (2006.01)
 *C09K 8/46* (2006.01)
 *E21B 33/138* (2006.01)
(52) U.S. Cl.
 CPC ................. *C09K 8/46* (2013.01); *E21B 33/138* (2013.01)

(58) Field of Classification Search
 CPC ....................................................... C04B 11/00
 See application file for complete search history.

(56) References Cited

U.S. PATENT DOCUMENTS

| 4,661,161 A | 4/1987 | Jakacki et al. |
| 8,343,273 B1 | 1/2013 | Lettkeman et al. |

OTHER PUBLICATIONS

Lettkeman, U.S. Appl. No. 14/514,961, filed Oct. 15, 2014, "Compositions With Synthetic Gypsum and Methods".

*Primary Examiner* — Paul Marcantoni
(74) *Attorney, Agent, or Firm* — Greer, Burns & Crain, Ltd.; Brian Wishnow; Philip T. Petti

(57) ABSTRACT

An oil well cementing product comprising DTPA-coated synthetic calcined gypsum, at least one accelerator, at least one retarder, at least one plasticizer and limestone is provided. Also provided are methods for cementing oil wells with mixtures comprising DTPA-coated synthetic calcined gypsum, at least one accelerator, at least one retarder, at least one plasticizer and limestone.

11 Claims, No Drawings

OIL WELL CEMENTING PRODUCTS WITH SYNTHETIC GYPSUM AND METHODS

RELATED APPLICATIONS

This application relates to U.S. patent application Ser. No. 14/514,961, the entire disclosure of which is incorporated herein by reference.

FIELD OF THE INVENTION

This invention relates to oil well cementing products with modified synthetic gypsum and methods for oil well casting.

BACKGROUND

Natural gypsum is also known as calcium sulfate dihydrate, terra alba or landplaster. Calcined gypsum is obtained by removing part of the water associated with the gypsum crystal. Synonymous terms for calcined gypsum are Plaster of Paris, stucco, calcium sulfate half-hydrate and calcium sulfate hemihydrate. Calcined gypsum, stucco and hemihydrate are the most commonly used terms, and they are used interchangeably in this application. When gypsum is mined, the natural rock is found in the dihydrate form, having about two water molecules associated with each molecule of calcium sulfate. In order to produce the stucco form, the gypsum can be calcined to drive off some of the water of hydration represented by the following equation:

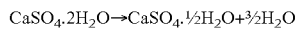
$$CaSO_4 \cdot 2H_2O \rightarrow CaSO_4 \cdot \tfrac{1}{2}H_2O + \tfrac{3}{2}H_2O$$

Calcium sulfate hemihydrate is obtained by calcination to remove the associated water molecules. The hemihydrate is produced in at least two crystal forms. Alpha-calcined gypsum is made by a slurry process or a lump rock process whereby the calcium sulfate dihydrate is calcined under pressure. The alpha-calcined gypsum forms less acicular crystals than beta-calcined gypsum, allowing the crystals to pack tightly together, making a denser and stronger plaster. The crystal morphology of alpha hemihydrate allows water to flow easily between the crystals, requiring less water to form a flowable slurry. More elongated irregular shaped crystals are characteristic of the beta-hemihydrate, which is obtained by calcining gypsum at atmospheric pressure. This crystal structure results in a less dense product because the crystals are more loosely packed. The beta form also requires more water to fluidize the calcined gypsum. If the calcining of the dihydrate is performed at ambient pressure, the beta form is obtained and the cost is relatively low compared to the alpha-calcined gypsum.

Synthetic gypsum, which is a byproduct of flue gas desulfurization processes from power plants, is also useful. Flue gas that includes sulfur dioxide is wet scrubbed with lime or limestone. Calcium from the lime combines with the sulfur dioxide to form calcium sulfite.

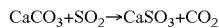
$$CaCO_3 + SO_2 \rightarrow CaSO_3 + CO_2$$

Via forced oxidation, the calcium sulfite is converted to calcium sulfate.

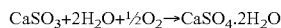
$$CaSO_3 + 2H_2O + \tfrac{1}{2}O_2 \rightarrow CaSO_4 \cdot 2H_2O$$

Synthetic gypsum is converted into calcium hemihydrate by calcination. While there are advantages to using synthetic calcined gypsum because this significantly decreases the environmental footprint, adding synthetic calcined gypsum usually increases water demand and more water is needed to prepare a workable gypsum slurry. Increasing the water demand is not desirable because this may affect unfavorably the strength of a gypsum product and may also increase the time and energy needed for evaporating the excess of water from the gypsum product.

Diethylene-triamine-pentaacetic acid (DTPA) is also known as a set retarder, but the dry powdered forms have been found to be ineffective. For example, U.S. Pat. No. 4,661,161 to Jacacki ("Jacacki") teaches the addition of a liquid form of diethylenetriamine pentaacetic acid ("DTPA"). U.S. Pat. No. 8,343,273 to Lettkeman et al., the entire disclose of which is incorporated herein by reference in its entirety, provides methods for utilizing DTPA as set retarder in compositions with beta stucco from calcined natural rock gypsum.

U.S. patent application Ser. No. 14/514,961 to Dennis Lettkeman et al. incorporated herein by reference in its entirety discloses modified synthetic calcined gypsum which has been coated with DTPA and methods for spray-coating with DTPA.

Oil is obtained in field from oil wells. Setting up an oil well includes oil well cementing which is a process of mixing a water-cement slurry and pumping it down through steel casing to critical points located in the area around the well casing, in the open well or below in the fractured formations.

Cement, such as for example Portland cement, is conventionally used in oil well cementing products. However, cement shrinks upon setting which affects negatively the tightness and strength of a cement plug in the oil well. This may lead to leakage and other problems. Mixing alpha calcium sulfate hemi-hydrate with cement improves the oil well cement composition because the composition no longer shrinks and may expand instead. This ensures that the cement plug is tight and minimizes the risk of leakage.

However, there remains the need for oil well cementing products that would expand upon setting and create a tight plug. There is also a need for oil well cementing products that would have sufficient fluidity to be pumped into an oil well, yet at the same time they must have a short setting time so that the cementing product sets soon after being pumped into the oil well.

SUMMARY

This invention provides oil well cementing products which comprise synthetic calcined gypsum spray-coated with DTPA. These products are formulated from slurries that exhibit improved flowability, setting time and compressive strength. One embodiment provides an oil well cementing product comprising DTPA-coated synthetic calcined gypsum, at least one accelerator, at least one retarder, at least one plasticizer and limestone. In some embodiments, an oil well cementing product further comprises at least one defoamer. In further embodiments, an oil well cementing product further comprises cement in the amount from about 0.1% to about 20% by weight of dry components. An oil well cementing product may include at least one plasticizer such naphthalene sulfonate, melamine sulfonate, polycarboxylate ether or any combination thereof. The amount of DTPA-coated synthetic calcined gypsum may vary. In some embodiments, the amount of DTPA-coated synthetic calcined gypsum is from about 80% to about 99% by weight of dry components.

Further embodiments provide methods for cementing an oil well. These methods include obtaining an oil well cementing product by blending together DTPA-coated synthetic calcined gypsum, at least one accelerator, at least one retarder, at least one plasticizer and limestone; blending the oil well cementing product with cement and water to obtain a cementing mixture; and then pumping the mixture into the oil well.

In some embodiments, the amount of the oil well cementing product in the cementing mixture is from about 10% to about 30%. Some embodiments include methods in which cement is at least one of the following: white cement, gray PORTLAND cement types I, II, III, imp milled cement and class C cement or any combination thereof.

DETAILED DESCRIPTION

This invention provides an oil well cementing product which comprises DTPA-coated synthetic calcined gypsum. In some embodiments, the oil well cementing product is a mixture which comprises DTPA-coated synthetic calcined gypsum, cement, at least one plasticizer, at least one accelerator and at least one retarder.

Suitable DTPA-coated synthetic calcined gypsum includes that disclosed in U.S. patent application Ser. No. 14/514,961, the entire disclosure of which is incorporated herein by reference.

Synthetic calcined gypsum with various levels of the DTPA coating is suitable for these oil well cementing products. In some embodiments, liquid DTPA may be sprayed on synthetic calcined gypsum at a wide range of addition rates which are beneficial. At low levels, such as, but not limited to, 0.1-1.0 lbs/min, it is advantageous to dilute the DTPA solution with water. This achieves a more uniform distribution of DTPA on the surfaces of the synthetic calcined gypsum. In other embodiments, DTPA can be used in the amount from 0.1 to 40 lbs/min. When used at the rates of above 10 lbs/minute, DTPA can be used undiluted. The process of spray-coating with DTPA can be performed at temperatures between 190 and 340 degrees Fahrenheit. At least in some embodiments, the spray coating takes place at a temperature selected from the range from 212 to 300 degrees Fahrenheit.

The rate of flow of synthetic calcined gypsum into a chamber in which it is spray-coated with DTPA can also be controlled. In some embodiments, from 1 to 20 tons per hour of synthetic calcined gypsum can be coated with DTPA.

Any source of DTPA can be used for obtaining the DTPA-coated synthetic calcined gypsum as described above. For example, suitable sources for DTPA include, but are not limited to, diethylenetriamine-pentaacetic acid ("DTPA") DTPA, such as NOGO™ Hydration Inhibitor (United States Gypsum Company, Chicago, Ill.) DTPA or VERSENEX 80® (UNIVAR, Oklahoma City, Okla.).

In further embodiments, other retarders can be also used either in combination with DTPA or separately for spray coating of synthetic calcined gypsum. These retarders include, but are not limited to, citric acid, tartaric acid, cream of tartar, Rochelle salts, retard K, proteinaceous retarder such as "SUMA" and sodium citrate.

In addition to DTPA-coated synthetic calcined gypsum, present oil well cementing products comprise cement. Various cements are suitable for these oil well cementing products with DTPA-coated synthetic calcined gypsum, including but not limited to, white cement, gray PORTLAND cement types I, II, III, imp milled cement and class C cement.

In some embodiments, present oil well cementing products comprise at least one plasticizer. Various plasticizers are suitable for these oil well cementing products with DTPA-coated synthetic calcined gypsum, including but not limited to, naphthalene sulfonates, melamine sulfonates, polycarboxylates and any mixture thereof. Suitable plasticizers include those that are commercially available, such as Melment F-10, F-15G, F-17G, Melflux 5581F, Melflux 4930, Melflux 6681, Melflux 2651, Melflux 1641, Melflux 2641, Lomar D, Lomar HP, Daxad 19, but not limited to the same.

In some embodiments, present oil well cementing products comprise at least one accelerator. Various accelerators are suitable for these oil well cementing products with DTPA-coated synthetic calcined gypsum, including but not limited to Climate Stable Accelerator (CSA®), Heat Resistant Accelerator (HRA®), TERRA ALBA®, all forms of calcium sulfate dehydrate, aluminum sulfate, zinc sulfate, and potassium sulfate.

In some embodiments, present oil well cementing products comprise at least one retarder. Various retarders are suitable for these oil well cementing products with DTPA-coated synthetic calcined gypsum, including but not limited to, citric acid, tartaric acid, cream of tartar, Rochelle salts, retard K, proteinaceous retarder such as "SUMA" and sodium citrate.

In some embodiments, the present oil well cements contain at least one type of defoamer or a combination such as but not limited to Vinnapor 9010F, Foamaster PD-1 and Foamaster CN. Without wishing to be bound by a theory, defoamers may aide in the reduction of entrapped and/or entrained air, tighten the matrix and improve the density control and compressive strength of the resultant hardened material.

Table 1 provides one embodiment for an oil well cementing product with DTPA-coated synthetic calcined gypsum.

TABLE 1

Oil Well Cementing Product With DTPA-Coated Synthetic Calcined Gypsum

| Materials | Percentage (%) | Exemplary Materials |
| --- | --- | --- |
| DTPA-coated synthetic calcined gypsum | 93.79-98.73% | DTPA-coated synthetic calcined gypsum |
| Portland Cement | 0-4.9% | Type I, Type I-II, Class C, Type V, but not limited to the same. |
| Plasticizer | 0.099%-0.99% | Melment F-10, F-15G, F-17G, Lomar D, Lomar HP, Daxad 19, but not limited to the same. |
| Accelerator (1) | 0-0.099% | Terra Alba ®, Climatic Stable Accelerator, Heat Resistant Accelerator, potassium sulfate but not limited to the same. |
| Retarder (1) | 0-0.197% | Suma Retarder, National Retarder, Citric Acid, Sodium Citrate, but not limited to the same. |

Further embodiments include oil well cementing products with DTPA-coated synthetic calcined gypsum to which some limestone, such as for example autoclaved high-purity dolomitic limestone known under the trade name IVORY LIME™, is added. Such products comprise DTPA-coated synthetic calcined gypsum as the main component in the range from about 80% to about 100%, some cement in the amount of about 20%, at least one plasticizer, at least one retarder and IVORY LIME™.

One embodiment for an oil well cementing product with DTPA-coated synthetic calcined gypsum and IVORY LIME™ is provided in Table 2 below.

TABLE 2

Oil Well Cementing Product with Limestone

| Formulation | Acceptable Range (%) | Preferred Range (%) |
| --- | --- | --- |
| DTPA-Coated Synthetic Calcined Gypsum | 80-100 | 98.53% |

TABLE 2-continued

Oil Well Cementing Product with Limestone

| Formulation | Acceptable Range (%) | Preferred Range (%) |
|---|---|---|
| Portland Cement Class "C" | 0-20 | 0.9853% |
| Melflux 5581F | 0.01-1 | 0.22% |
| Climatic Stable Accelerator (CSA) | 0-0.25 | 0.00001% |
| IVORY LIME ™ (autoclaved limestone) | 0-1 | 0.25% |

It has been unexpectedly determined that an oil well cementing product formulated with DTPA-coated synthetic caclined gypsum has improved fluidity, yet it also has the decreased water demand. These properties are advantageous for oil well cementing products because a cementing mixture is pumped into an oil well and must remain fluid for a period of time needed to pump the mixture into the well. Yet, the mixture should set as soon as possible to prevent shifting and leakage.

A comparative analysis was conducted on an oil well cementing product formulated with DTPA-coated synthetic calcined gypsum in comparison to a cementing product obtained with alpha-calcined gypsum. As shown in Table 3 below, DTPA-coated synthetic calcined gypsum improves fluidity of the mixture as shown by the slump test, yet it does not increase the water demand.

TABLE 3

Comparative Analysis

| Physical Properties of Oil Well Cement | Oil Well Cement Made with Alpha-Calcined Gypsum | Oil Well Cement Made with DTPA-Coated Synthetic Gypsum |
|---|---|---|
| Normal Consistency: (cc) | 34 cc | 34 cc |
| Hand Mix 300 g Vicat Set: (min) | 60 min | 61 min |
| Temperature Rise Set: (min) | 84 min | 74 min |
| Maximum Rate of Rise: (deg/min) | 3.44 deg/min | 5.44 deg/min |
| Linear Expansion: (% max) | 0.198% | 0.167% |
| 1"x2" Slump Diameter: (in) | 4.25" | 6.38" |
| Wet Density: (#/ft3) | 116.47 #/ft3 | 119.65 #/ft3 |
| 1 hour Compressive Strength: (PSI) | 4392 PSI | 4392 PSI |
| Dry Density: (#/ft3) | 102.33 #/ft3 | 101.17 #/ft3 |
| Dry Compressive Strength: (PSI) | 9492 PSI | 8542 PSI |
| Hobart Mix 300 g Vicat Set: (min) | 44 min | 56 min |
| Total Dispersed Consistency: (cc) | 54 cc | 51 cc |

One embodiment provides an oil well cementing product comprising DTPA-coated synthetic calcined gypsum, limestone, at least one accelerator, at least one retarder, at least one plasticizer and cement. In some embodiments, all ingredients, except for cement, can be pre-mixed, stored and shipped as needed to an oil well location in field. At the oil well site, the mixture comprising DTPA-coated synthetic calcined gypsum, limestone, at least one accelerator, at least one retarder, at least one plasticizer is then further mixed with cement and water.

Suitable blends with cement include those listed in Table 4 below.

TABLE 4

Comparative Analysis of Oil Well Cementing Products with DTPA-Coated Synthetic Calcined Gypsum

| Formulation | Normal Consistency: (cc) | Hand Mix 300 g vicat set |
|---|---|---|
| Alpha based gypsum oil well cement | 34 cc | 55 min |
| 90% Class "C" 10% Alpha based gypsum oil well cement | 56 cc | 325 min |
| 85% Class "C" 15% Alpha based gypsum oil well cement | 55 cc | 86 min |
| 80% Class "C" 20% Alpha based gypsum oil well cement | 55 cc | 25 min |
| DTPA-coated synthetic calcined gypsum Oil Well Cement | 34 cc | 61 min |
| 80% Class "C" 20% DTPA-coated synthetic calcined gypsum Oil Well Cement | 45 cc | 16 min |

As can be seen from Table 4, various oil well cement blends were analyzed for normal water consistency which measures water demand, and Vicat Set time which measures a setting time. It is advantageous to achieve a low normal consistency because this corresponds to a low water demand. It is also advantageous to obtain blends with the Vicat Set time as shown. As can be seen from Table 4 above, when DTPA-coated synthetic calcined gypsum is used in the amount equal or larger than 20%, the normal consistency of the blend and its water demand is lower than that for an alpha-gypsum based oil well cement. Thus, this mixture has an improved flow and pumpability, both properties are advantageous for oil well cementing products.

Additional blends include those prepared with Portland Cement Type I-II and DTPA-coated synthetic calcined gypsum. These blends include those listed in Table 5 below.

TABLE 5

Oil Well Cementing Products with Portland Cement Type I-II.

| Blend | Normal Consistency: (cc) | Hand Mix 300 g vicat set |
|---|---|---|
| Alpha based gypsum oil well cement | 34 cc | 55 min |
| DTPA-coated synthetic calcined gypsum based Oil Well Cement | 34 cc | 61 min |
| Portland Cement I-II | 42 cc | 354 min |
| 90% Portland Cement I-II 10% Alpha based gypsum oil well cement: | 54 cc | 33 min |
| 80% Type I- II Portland Cement 20% Alpha based gypsum oil well cement | 53 cc | 30 min |

TABLE 5-continued

Oil Well Cementing Products with Portland Cement Type I-II.

| Blend | Normal Consistency: (cc) | Hand Mix 300 g vicat set |
|---|---|---|
| 90% Type I- II Portland Cement 10% DTPA-coated synthetic calcined gypsum based Oil Well Cement | 42 cc | 286 min |
| 85% Type I- II Portland Cement 15% DTPA-coated synthetic calcined gypsum based Oil Well Cement | 39 cc | 7 min |
| 80% Type I- II Portland Cement 20% DTPA-coated synthetic calcined gypsum based Oil Well Cement | 39 cc | 7 min |

As can be seen from Table 6, oil well compositions with cement alone have a setting time of more than several hours. However, formulating a blend with 15% to 20% of DTPA-coated synthetic calcined gypsum decreases the setting time to 7 minutes, which is a significant improvement. Further, a water demand for an oil well cementing product comprising from 15% to 20% of DTPA-coated synthetic calcined gypsum also decreases significantly to 39 cc.

Thus, there is unexpected improvement in flow using the Type I-II Portland cement in combination with DTPA-coated synthetic calcined gypsum. The use of the Type I-II Portland cement with DTPA-coated synthetic calcined gypsum also results in improved flow with increasing impact of accelerating the setting time.

The predicted normal consistency of a 50/50 blend of the Type I-II Portland Cement and DTPA-coated synthetic calcined gypsum oil well cement would be approximately 38 cc. The unexpected result involves the reduction to 39 cc when only a 15% blend of the DTPA-coated synthetic calcined gypsum oil well cement is used.

Further comparative analysis is reported in Table 6 and shows that blending the DTPA-coated synthetic calcined gypsum oil well cement with Portland cement improves normal consistency and decreases the vicat set time.

TABLE 6

Comparison of Alpha Calcium Sulfate Hemi-Hydrate Based Oil Well Cement to DTPA-coated Synthetic Calcined Gypsum Based Oil Well Cement When Blended with Portland Cement I-II.

| Formulation | Normal Consistency: (cc) | % change in Normal Consistency (flowability) | Hand Mix 300 g vicat set | % change in vicat set (acceleration of cement) |
|---|---|---|---|---|
| alpha based gypsum oil well cement (Gyp OWC) | 34 cc | N/A | 55 min | N/A |
| DTPA-coated synthetic calcined gypsum based Oil Well Cement | 34 cc | N/A | 61 min | N/A |
| Portland Cement I-II | 42 cc | 0 | 354 min | 0 |
| 80% Type I- II Portland Cement 20% Alpha based gypsum oil well cement | 53 cc | INCREASED the Normal Consistency of the Portland Cement 26.19% | 30 min | DECREASED SET 91.53% |
| 80% Type I- II Portland Cement 20% % DTPA-coated synthetic calcined gypsum based Oil Well Cement | 45 cc | INCREASED the Normal Consistency of the Portland Cement 7.14% | 7 min | DECREASED 98% |

Further embodiments includes blends in which DTPA-coated synthetic calcined gypsum based oil well cement is mixed with 50% Portland Cements. As shown in Table 7 below, these formulations have low water demand and improved setting time.

TABLE 7

Gypsum Based Oil Well Cement Blend with 50% Portland Cements

| Formulation | Normal Consistency: (cc) | Hand Mix 300 g vicat set |
|---|---|---|
| Alpha based gypsum oil well cement (Gyp OWC) | 34 cc | 55 min |
| DTPA-coated synthetic calcined gypsum based Oil Well Cement | 34 cc | 61 min |
| 50% Portland Cement Class "C"/50% Alpha Calcium Sulfate Hemi-hydrate Based Oil Well Cement | 38 cc | 9 min |
| 50% Portland Cement Class "C"/50(Y0 DTPA-coated synthetic calcined gypsum based Oil Well Cement | 34 cc | 6 min |

As can be seen from Table 7, a formulation with DTPA-coated synthetic calcined gypsum performs better than a formulation with alpha calcium sulfate hemi-hydrate.

Further embodiments provide methods for cementing oil wells. Such methods include mixing together an oil well cementing product with cement and water and pumping the mixture into an oil well.

These cementing methods can be performed with a pumping truck capable of introducing large quantities of slurry under very high pressure to wells having depths as much as 12,000 feet or more. Other embodiments can be performed with a dump bailer unit which is suitable for small volume applications.

In some embodiments, the mixture can be pumped into an oil well under pressure to seal the well. Other uses are for lost circulation where it is used to seal fissures and crevices, as a shot tamp to hold the force of a shot down as when the casing is perforated or when a zone is fractured for better oil flow, for blow-outs or sealing of a gas producing zone, for repairing split or corroded casing and for bridging plugs which are held tight by placing the mixture on top to hold the plug tight and shut off movement of fluids or gases while tests or repairs are made.

Example 1

Several blends of oil well cementing product were prepared by blending together the compounds as shown in Table 8A below.

TABLE 8A

Compositions with Sulfonated Melamine as a Plasticizer.

| Formulation | Alpha Calcium Sulfate Hemi-hydrate Based Oil Well Cement | Inventive Blend Formula 1 | Inventive Blend Formula 2 |
|---|---|---|---|
| HYDROCAL ® B-Base Gypsum Cement | 2000# | 1000# | 1000# |
| DTPA-coated synthetic calcined gypsum | 0# | 1000# | 1000# |
| Portland Cement Class "C" | 20# | 20# | 20# |
| Melment F-17 G (sulfonated melamine) | 5.125# | 8# | 9# |
| Climatic Stable Accelerator (CSA) | 0.125# | 0.125# | 0.125# |
| Suma Retarder (Protein Based Retarder) | 0.5# | 3# | 3# |
| Total | 2025.75# | 2031.13# | 2032.13# |

Various physical properties of the formulations from Table 8A were compared for water demand, setting time, temperature rise, compressive strength and fluidity by the slump test. The results of this comparative analysis are presented in Table 8B below.

TABLE 8B

Physical Properties of Formulations from Table 8A

| Physical Properties | Alpha Calcium Sulfate Hemi-hydrate Based Oil Well Cement | Inventive Blend Formula 1 | Inventive Blend Formula 2 |
|---|---|---|---|
| Normal Consistency: (cc) | 34 cc | 34cc | 34 cc |
| Hand Mix 300 g Vicat Set: (min) | 60 min | 26 min | 50 min |
| Temperature Rise Set: (min) | 84 min | 63 min | 120 min |
| Maximum Rate of Rise: (deg/min) | 3.44 deg/min | 3.61 deg/min | 4.09 deg/min |
| Linear Expansion: (% max) | 0.198% | 0.309 % | 0.289% |
| 1"x2" Slump Diameter: (in) | 4.25" | 3.50" | 4.19# |
| Wet Density: (#/ft3) | 116.47 #/ft3 | 119.02 #/ft3 | 118.99 #/ft3 |
| 1 hour Compressive Strength: (PSI) | 4392 PSI | 4358 PSI | 4333 PSI |
| Dry Density: (#/ft3) | 102.33 #/ft3 | 102.95 #/ft3 | 103.08 #/ft3 |
| Dry Compressive Strength: (PSI) | 9492 PSI | 10,908 PSI | 9,783 PSI |
| Hobart Mix 300 g Vicat Set: (min) | 44 min | 20 min | 47 min |

As shown in Table 8B, inventive blends 1 and 2 have a higher rate of hydration in comparison to a control blend with alpha calcium sulfate hemi-hydrate, as reflected in the maximum rate of rise. Very importantly, inventive blends 1 and 2 demonstrate improved expansion and increased compressive strength. These blends are preferred because they produce a tighter plug or seal for the oil well casing.

Example 2

Additional blends were formulated as shown in Table 9A.

TABLE 9A

Compositions with Various Plasticizers

| Formulation | Alpha Calcium Sulfate Hemi-hydrate Based Oil Well Cement | Inventive Blend Formula 3 | Inventive Blend Formula 4 |
|---|---|---|---|
| HYDROCAL ® B-Base Gypsum Cement | 2000# | 1000# | 1000# |
| DTPA-coated synthetic calcined gypsum | 0# | 1000# | 1000# |
| Portland Cement Class "C" | 20# | 20# | 20# |
| Melment F-17 G (melamine sulfonate) | 5.125# | 8# | 9# |
| Lomar D (naphthalene sulfonate) | 0 | 12.5# | 0 |
| Daxad 19 (naphthalene sulfonate) | 0 | 0 | 12.5# |
| Climatic Stable Accelerator (CSA) | 0.125# | 0.125# | 0.125# |
| Suma Retarder (Protein Based Retarder) | 0.5# | 3# | 3# |
| Total | 2025.75# | 2031.13# | 2032.13# |

Physical properties of inventive blends 3 and 4 were studied in comparison to a control blend with alpha calcium sulfate hemi-hydrate. The results from these tests are reported in Table 9B below.

TABLE 9B

Physical Properties of Formulations from Table 9A

| Physical Properties | Alpha Calcium Sulfate Hemi-hydrate Based Oil Well Cement | Inventive Blend 3 | Inventive Blend 4 |
| --- | --- | --- | --- |
| Normal Consistency: (cc) | 34 cc | 34cc | 34 cc |
| Hand Mix 300 g Vicat Set: (min) | 60 min | 48 min | 61 min |
| Temperature Rise Set: (min) | 84 min | 58 min | 69 min |
| Maximum Rate of Rise: (deg/min) | 3.44 deg/min | 4.88 deg/min | 4.33 deg/min |
| Linear Expansion: (% max) | 0.198% | 0.423% | 0.274% |
| 1"x2" Slump Diameter: (in) | 4.25" | 4.75" | 4.5" |
| Wet Density: (#/ft3) | 116.47 #/ft3 | 119.00 #/ft3 | 118.74 #/ft3 |
| 1 hour Compressive Strength: (PSI) | 4392 PSI | 3785 PSI | 3808 PSI |
| Dry Density: (#/ft3) | 102.33 #/ft3 | 102.35 #/ft3 | 102.36 #/ft3 |
| Dry Compressive Strength: (PSI) | 9492 PSI | 9792 PSI | 9508 PSI |
| Hobart Mix 300 g Vicat Set: (min) | 44 min | 43 min | 54 min |

As shown in Table 9B, inventive blends 3 and 4 generate high expansion and acceptable compressive strength. Both properties are highly desirable in oil well cementing applications where a tight plug is required. Thus, blends 3 and 4 provide an improvement over conventional cements which shrink during casting.

Example 3

Additional oil well cement formulations were prepared as shown in Table 10A below.

TABLE 10A

Compositions with Polycarboxylate Plasticizers

| Formulation | Alpha Calcium Sulfate Hemi-hydrate Based Oil Well Cement | Inventive Blend 5 | Range for inventive blend 5 | Inventive Blend 6 | Range for inventive blend 6 |
| --- | --- | --- | --- | --- | --- |
| HYDROCAL ® B-Base Gypsum Cement (alpha calcium sulfate hemi-hydrate) | 2000# | 1000# | 100-1900#/500-1500# | 1000# | 100-1900#/500-1500# |
| DTPA-coated synthetic calcined gypsum | 0# | 1000# | 200-1700#/500-1500# | 1000# | 200-1700#/500-1500# |
| Portland Cement Class "C" | 20# | 20# | 0-100#/10-50# | 20# | 0-100#/10-50# |
| Melment F-17 G | 5.125# | | | | |
| Meffiux 4390F | | 1# | 0.25-20#/0.5-10# | | |
| Meffiux 6681F | | | | 1# | 0.25-20#/0.5-10# |
| Ivory Lime | 0 | 5# | 0-30#/5-15# | 5# | 0-30#/5-15# |
| Climatic Stable Accelerator (CSA) | 0.125# | 0.125# | 0-3#/.125-1# | 0.125# | 0-3#/.125-1# |
| Suma Retarder (Protein Based Retarder) | 0.5# | 3# | 0-15#/0.5-5# | 3# | 0-15#/0.5-5# |
| Total | | 2025.75# | | | |

Physical properties of the blends from Table 10A are reported in Table 10B below.

TABLE 10B

Physical Properties of Blends from Table 10A.

| Physical Properties Key to Gypsum Based Oil Well Cements | Alpha Calcium Sulfate Hemi-hydrate Based Oil Well Cement | Blend Formula 5 - with use of alternate PCE | Blend Formula 6 - with use of alternate PCE |
|---|---|---|---|
| Normal Consistency: (cc) | 34 cc | 34cc | 34 cc |
| Hand Mix 300 g Vicat Set: (min) | 60 min | 32 min | 44 min |
| Temperature Rise Set: (min) | 84 min | 50 min | 64 min |
| Maximum Rate of Rise: (deg/min) | 3.44 deg/min | 4.00 deg/min | 2.88 deg/min |
| Linear Expansion: (% max) | 0.198% | 0.171 % | 0.041% |
| 1"x2" Slump Diameter: (in) | 4.25" | 4.94" | 5.50" |
| Wet Density: (#/ft3) | 116.47 #/ft3 | 119.02 #/ft3 | 118.86 #/ft3 |
| 1 hour Compressive Strength: (PSI) | 4392 PSI | 4617 PSI | 4183 PSI |
| Dry Density: (#/ft3) | 102.33 #/ft3 | 102.82 #/ft3 | 102.16 #/ft3 |
| Dry Compressive Strength: (PSI) | 9492 PSI | 10675 PSI | 9717 PSI |
| Hobart Mix 300 g Vicat Set: (min) | 44 min | 30 min | 46 min |

Additional blends were prepared with a blend of polycarboxylate plasticizers as shown in Table 11A below.

TABLE 11A

Formulations with a blend of polycarboxylate plasticizers.

| Formulation | Alpha Calcium Sulfate Hemi-hydrate Based Oil Well Cement | Inventive Blend 7 | Blend Formula 7 - Range of Usefulness / preferred | Inventive Blend 8 | Blend Formula 8 - Range of Usefulness / preferred |
|---|---|---|---|---|---|
| HYDROCAL ® B-Base Gypsum Cement | 2000# | 1000# | 100-1900#/500-1500# | 1000# | 100-1900#/500-1500# |
| FST NOGO CKS SYNTHETIC (ECOGYPSUM ™) STUCCO | 0# | 1000# | 200-1700#/500-1500# | 1000# | 200-1700#/500-1500# |
| Portland Cement Class "C" | 20# | 20# | 0-100#/10-50# | 20# | 0-100#/10-50# |
| Melment F-17 G | 5.125# | 1# | 0.25-20#/0.5-10# | 0.75# | 0.25-20#/0.5-10# |
| Meffiux 5581F | 0 | 1# | 0.25-20#/0.5-10# | 0.75# | 0.25-20#/0.5-10# |
| Marasperse C-21 | 0 | 1# | 0.25-20#/0.5-10# | 0.75# | 0.25-20#/0.5-10# |
| Ivory Lime | 0 | 0# | 0-30#/0-15# | 0# | 0-30#/0-15# |
| Defoamer (Vinapor 9010F) | 0 | 1.5# | 0-10#/0-3# | 1.5# | 0-10#/0-3# |
| Climatic Stable Accelerator (CSA) | 0.125# | 0.125# | 0-3#/.125-1# | 0.125# | 0-3#/.125-1# |
| Suma Retarder (Protein Based Retarder) | 0.5# | 3# | 0-15#/0.5-5# | 3# | 0-15#/0.5-5# |
| Total | 2025.75# | | | | |

Physical properties of the formulations from Table 11A are reported in Table 11B below.

TABLE 11B

Physical Properties of Formulations from Table 11A.

| Physical Properties | Alpha Calcium Sulfate Hemi-hydrate Based Oil Well Cement | Blend Formula 3-Lomar D | Blend Formula 4 -Daxad 19 |
|---|---|---|---|
| Normal Consistency: (cc) | 34 cc | 34cc | 34 cc |
| Hand Mix 300 g Vicat Set: (min) | 60 min | 32 min | 44 min |
| Temperature Rise Set: (min) | 84 min | 50 min | 64 min |
| Maximum Rate of Rise: (deg/min) | 3.44 deg/min | 4.00 deg/min | 2.88 deg/min |
| Linear Expansion: (% max) | 0.198% | 0.171 % | 0.041% |
| 1"x2" Slump Diameter: (in) | 4.25" | 4.94" | 5.50" |
| Wet Density: (#/ft3) | 116.47 #/ft3 | 119.02 #/ft3 | 118.86 #/ft3 |
| 1 hour Compressive Strength: (PSI) | 4392 PSI | 4617 PSI | 4183 PSI |
| Dry Density: (#/ft3) | 102.33 #/ft3 | 102.82 #/ft3 | 102.16 #/ft3 |
| Dry Compressive Strength: (PSI) | 9492 PSI | 10675 PSI | 9717 PSI |
| Hobart Mix 300 g Vicat Set: (min) | 44 min | 30 min | 46 min |

While particular embodiments have been shown and described, it will be appreciated by those skilled in the art that changes and modifications may be made thereto without departing from the invention in its broader aspects and as set forth in the following claims.

What is claimed is:

1. An oil well cementing composition comprising diethylene-triamine-pentaacetic acid (DTPA)-coated synthetic calcined gypsum, at least one accelerator, at least one retarder, at least one plasticizer and limestone.

2. The oil well cementing composition of claim 1, wherein the oil well cementing composition further comprises cement in the amount from about 0.1% to about 20% by weight of dry components.

3. The oil well cementing composition of claim 1, wherein the plasticizer is selected from the group consisting of: naphthalene sulfonate, melamine sulfonate, polycarboxylate ether and any combination thereof.

4. The oil well cementing composition of claim 1, wherein the amount of DTPA-coated synthetic calcined gypsum is from about 80% to about 99% by weight of dry components.

5. The oil well cementing composition of claim 1, wherein the limestone is autoclaved limestone and it is in the amount from 0.1% to about 1% by weight of dry components.

6. The oil well cementing composition of claim 1, wherein the composition further comprises alpha calcium sulfate hemi-hydrate.

7. A method of cementing an oil well, the method comprising:
   obtaining an oil well cementing composition by blending together DTPA-coated synthetic calcined gypsum, at least one accelerator, at least one retarder, at least one plasticizer and limestone;
   blending the oil well cementing composition with cement and water to obtain a cementing mixture; and
   pumping the mixture into the oil well.

8. The method of claim 7, wherein the oil well cementing composition comprises from about 10% to about 30% of the mixture, based on the weight of dry components.

9. The method of claim 7, wherein the cement is selected from the group consisting of white cement, gray PORTLAND cement types I, II, III, imp milled cement and class C cement and any combination thereof.

10. The method of claim 7, wherein the ratio between the oil well cementing composition and cement is 50:50.

11. The oil well cementing composition of claim 1 which further comprises a defoamer.

* * * * *